Nov. 27, 1934.    L. DREYFUS ET AL    1,981,994
MEANS FOR OPERATING ELECTRIC HIGH FREQUENCY FURNACES
Filed Dec. 1, 1932    4 Sheets-Sheet 3

Inventors.
Ludwig Dreyfus.
Aage Garde.
per Wm Wallace White
Attorney.

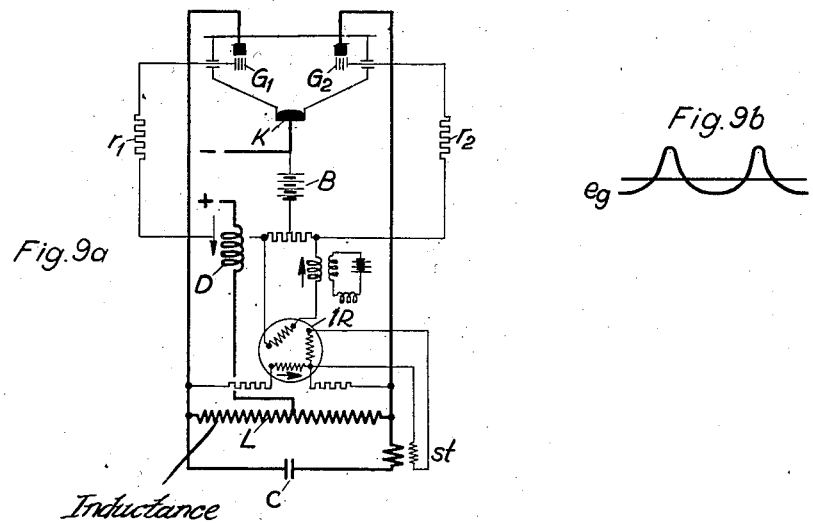
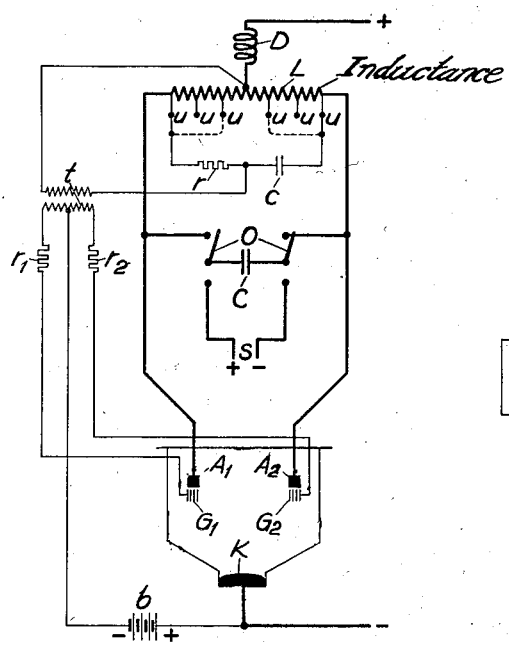
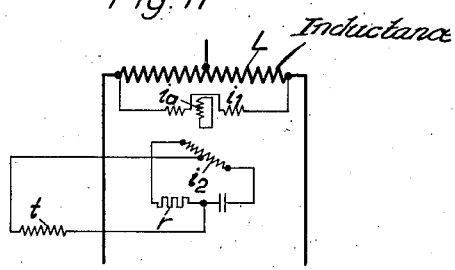
Inventors.
Ludwig Dreyfus.
Aage Garde.
per
Attorney.

Patented Nov. 27, 1934

1,981,994

UNITED STATES PATENT OFFICE 1,981,994

MEANS FOR OPERATING ELECTRIC HIGH FREQUENCY FURNACES

Ludwig Dreyfus and Aage Garde, Vasteras, Sweden, assignors to Allmänna Svenska Elektriska Aktiebolaget, Vasteras, Sweden, a corporation of Sweden Application December 1, 1932, Serial No. 645,200 In Sweden June 9, 1932

2 Claims. (Cl. 250—36)

The current of electric induction furnaces for high frequency has hitherto been produced in two different ways, namely, either as an oscillation generated by resonance and having a frequency determined by the characteristics of the resonance circuit, or by means of a high frequency machine with a frequency determined by the speed of the said machine. In installations of the former kind, a spark gap or the like has been used for initiating the resonance oscillations, but this has caused a very low efficiency, generally not above 50 per cent and has further only permitted the use of small amounts of power. The latter method has necessitated the use of expensive machine installations.

The present invention provides a third method of generating the high frequency current which combines most of the advantages of the two aforesaid methods but is free from their disadvantages.

According to the invention, the high frequency current is generated by conversion from direct current or low frequency alternating current by means of a grid controlled ion valve apparatus containing metal vapour of low pressure, for instance a so-called mercury arc rectifier, in combination with a resonance circuit. This installation can be built for large amounts of power, has a high efficiency and is considerably cheaper than a high frequency generator of the machinery type. In operating the installation, the choice is free, as is evident from the following, between determining the frequency by means of the constants of the resonance circuit or controlling it by means of an impressed frequency, at least between certain limits. The installation may thereby be easily and readily adapted to the rather rapidly changing conditions during a melting procedure so that the result can be more favorable than heretofore also from a metallurgical point of view.

Figure 1A:
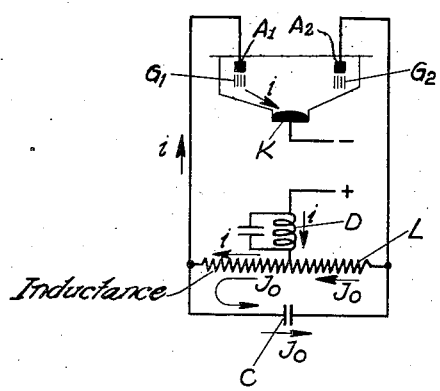
Figure 1B:
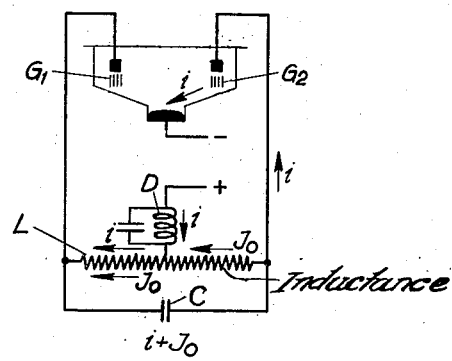
Figure 2:
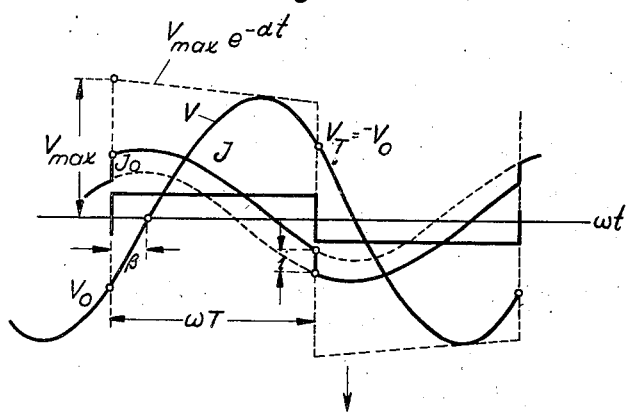
Figure 3:
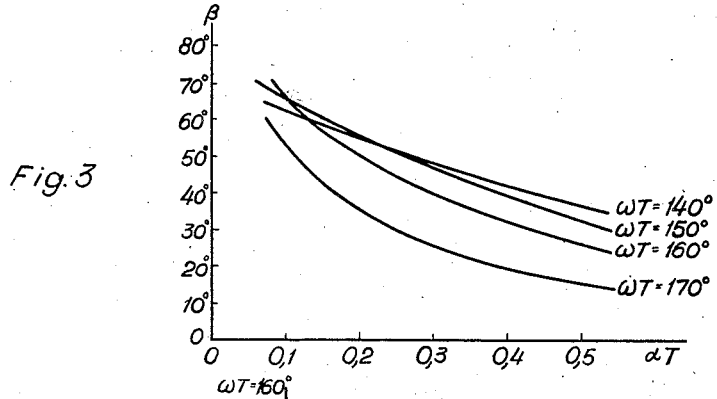
Figure 4:
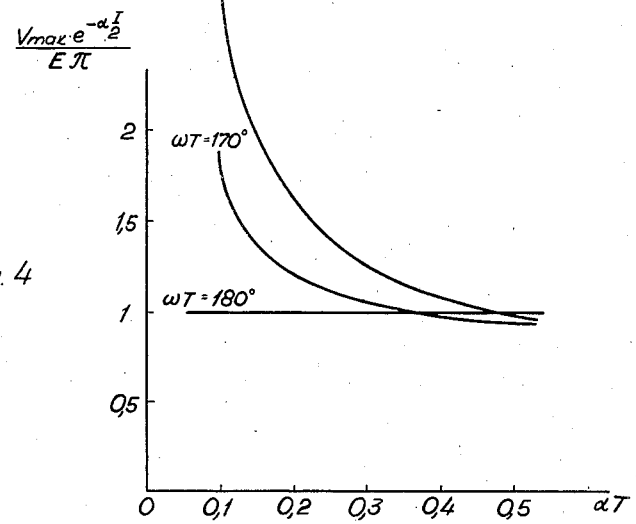
Figure 5:
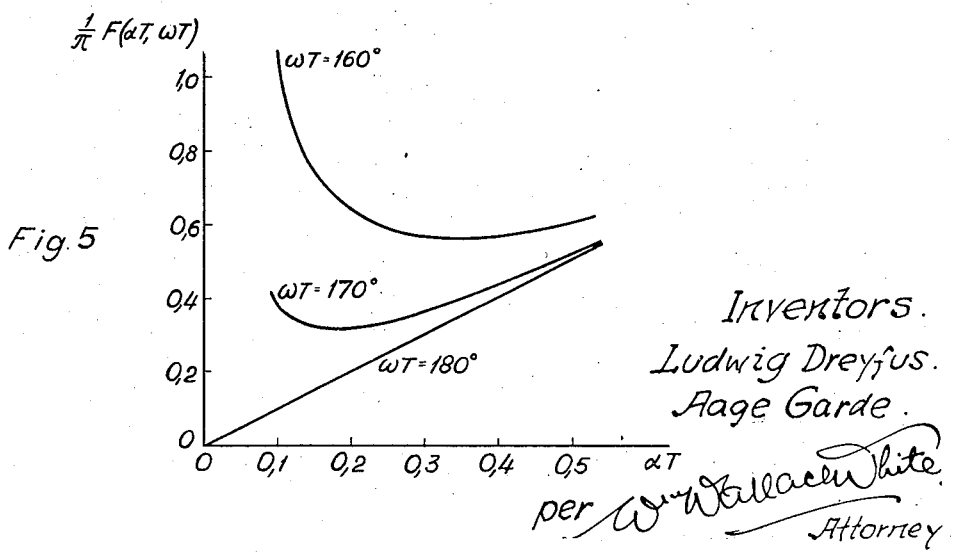
Figure 6A:
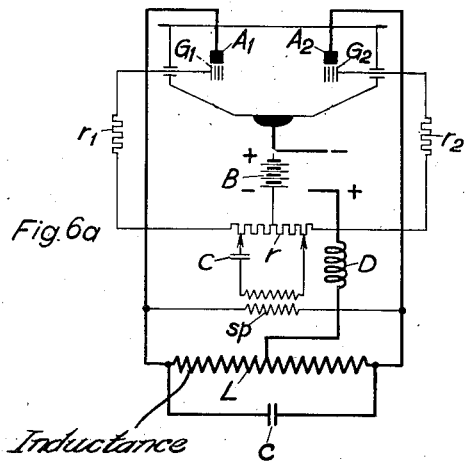
Figure 6B:
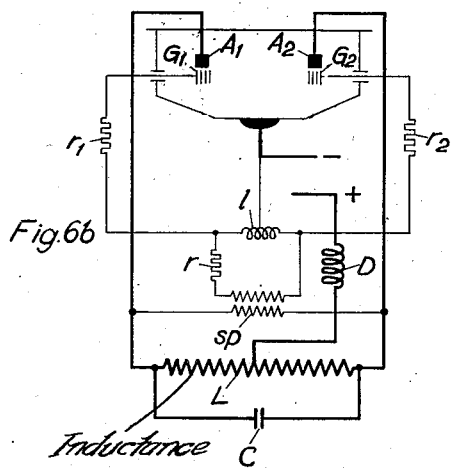
Figure 7A:
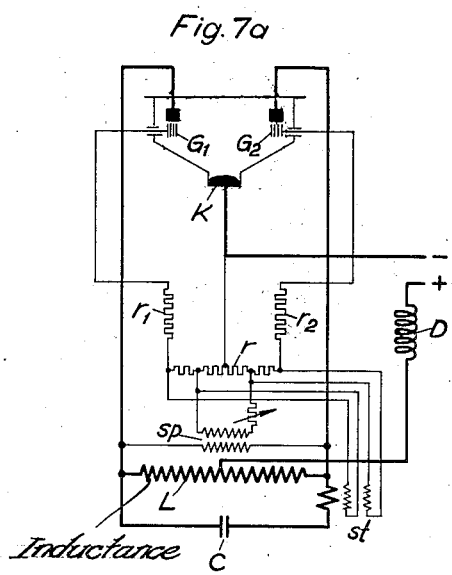
Figure 6C:
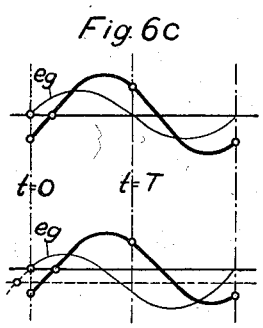
Figure 8A:
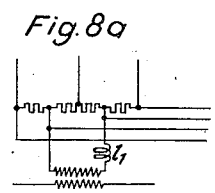
Figure 7B:
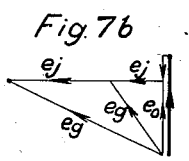
Figure 8B:

In the accompanying drawings, Figures 1a and 1b show a principal diagram of the installation with the current direction during two different time intervals indicated by arrows and Figure 2 a corresponding time diagram. Figures 3 to 5 show three curve diagrams of the characteristical data of the installation. Figures 6a and 6b show two modifications of a more detailed diagram of connection including an arrangement for accomplishing the grid control, and Figure 6c is a corresponding time diagram. Figures 7a and 8a show other diagrams of connections for the same purpose and Figures 7b and 8b corresponding vector diagrams. Figure 9a shows a further diagram of connections for accomplishing the grid control and Figure 9b a corresponding time diagram. Figure 10 shows a further diagram of connection, particularly for starting the oscillations and Figure 11 a modification of a detail thereof.

In Figures 1a and 1b, $A_1$, $A_2$ designate two anodes of an ion valve apparatus of the same type as an ordinary mercury arc rectifier, $G_1$, $G_2$ corresponding control grids, and K the cathode, L is the furnace winding serving also as the inductance in a resonance circuit, and C is a capacity connected in parallel thereto, which capacity may be adjustable in large steps. The installation is, in the form shown, intended for direct current operation, and the direct current is supplied at the poles designated by $+$ $-$. It traverses a large inductance D (which if so desired may be connected in parallel with a capacity, as indicated), connected to the midpoint of the winding L. There will however hardly be any substantial difference if the direct current is replaced by low frequency alternating current, as the latter from the viewpoint of the high frequency can be regarded as a direct current the strength and direction of which is repeatedly altered.

Figure 1a illustrates the course of currents immediately before an interchange of function of the two anodes of the ion valve, and Figure 1b the course of currents immediately after such an interchange. The time course of voltage and currents during an entire cycle of the high frequency is illustrated in Figure 2. In the latter figure, V represents the voltage between the terminals of the condenser and/or of the furnace winding, for instance counted as positive on the left terminal with respect to the right one. In a certain instant of the continuous state, V has the negative value $V_0$, that is, the right terminal is positive and its voltage decreasing, a discharge current $J_0$ then flowing through the condenser to the right. Immediately before the aforesaid instant, the direct current $i$ flows through the left half of the furnace winding and the anode $A_1$ to the cathode and back to the direct current network (Figure 1a). In the said instant, however, the anode $A_1$ is blocked by its grid $G_1$ and the anode $A_2$ is released. The direct current $i$ is then practically instantaneously transferred to the anode $A_2$, but as no instantaneous variation is possible in the furnace winding, the result will be an instantaneous increase of the current in the condenser to $i+J_0$. The course of currents during the two next following semicycles will be evident from Figure 2 in which the full-drawn current curve represents the condenser current and the dotted current curve the current in that half of the furnace winding which is connected to the anode actually burning. Each of these curves is discontinuous in itself, but they form the continuation of each other, so that the current in each winding half will have a continuous course. In the following mathematical treatment, which in the first place is intended to show how the time interval $\beta$ between the instant of interchanging function of the anodes and the passage of the condenser voltage through zero affects the oscillation, only one semicycle is counted, as the functions are continuous during such a period and the conditions are repeated for each semicycle, only with inverted sign for every second one. The condenser current is here designated by J, the damping coefficient depending on furnace charge and losses, by $\alpha$, the natural angular velocity (frequency expressed in radians) of the high frequency circuit, attention paid to the damping, by $\omega$, and the length of a semicycle of the grid frequency by T. During each such semicycle, the condenser voltage V varies according to a damped sine function:

$$V = V_{max} e^{-\alpha t} \sin(\omega t - \beta) \quad (1)$$

In order that the oscillations shall continue, it is important that the interchange of function between the anodes takes place before the voltage V passes through zero. This implies that $$\omega T < \pi \quad (2)$$

The condition may also be expressed in such terms, that the frequency of the grid voltage shall be higher than the natural frequency of the system, or so that the angle $\beta$ (Figure 2) shall be positive and different from zero. The exact expression for this angle $\beta$ becomes for a large value of the inductance D $$\beta = \arctg \frac{\sin \omega T}{e^{\alpha T} + \cos \omega T} \quad (3)$$

Figure 3 of the drawings shows the angle $\beta$ as a function of $\alpha T$ at four different values of $\omega T$.

How much higher the controlling frequency should be chosen than the natural frequency depends in the first line on the respect to be paid to regulation of voltage and power. The voltage ratio depends on $\alpha T$ and $\omega T$ according to the formula:

$$\frac{V_{max} e^{-\frac{\alpha T}{2}}}{E} = \omega T \left(1 + \frac{\alpha^2}{\omega^2}\right) \frac{\sqrt{2(\cosh \alpha T + \cos \omega T)}}{\sinh \alpha T + \frac{\alpha}{\omega} \sin \omega T} \quad (4)$$

in which E is the direct current voltage. The dependence of the ratio from $\alpha T$ for three different values of $\omega T$ is seen from Figure 4.

With the voltage on the furnace, also the power P varies as follows:

$$P = E^2 \omega C \cdot \omega T \left(1 + \frac{\alpha^2}{\omega^2}\right) \frac{2(\cosh \alpha T + \cos \omega T)}{\sinh \alpha T + \frac{\alpha}{\omega} \sin \omega T} =$$

$$E^2 \omega C \cdot F(\alpha T, \omega T) \quad (5)$$

Figure 5 shows how P varies with $\alpha T$ for three different values of $\omega T$. Thus, at low values of $\alpha T$, corresponding to low power factor and thus generally occurring in high frequency furnaces, the furnace power increases essentially for decreasing values of $\omega T$.

In operating high frequency furnaces, both $\alpha$ and $\omega$ are generally variable during the melting procedure. The natural frequency $\omega$ thus varies with the permeability of the furnace charge which at least in melting iron and steel is strongly variable. In practice, $\omega$ will in such cases be about 1.5 to 2 times as high for a completely molten charge than at the beginning of the melting. The damping coefficient $\alpha$ is, on the other hand, nearly proportional to the power factor $\cos \varphi$ of the furnace, more exactly so that $$\frac{2\alpha}{\omega} = \cos \varphi \quad (6)$$

In melting steel, $\cos \varphi$ is at the beginning of the melting of the order of magnitude 0.3 and at the end of the order of magnitude 0.1. If the furnace voltage is kept constant, the power during the melting will therefore sink in about the proportion 2:1 or 1.5:1. If it is instead desired to keep the power constant, the voltage must be regulated by regulating $\omega T$ with respect to 180° by regulating the controlling frequency.

In certain cases, for instance for charges consisting of small pieces of high resistance, it may be advisable to employ already at the beginning of the melting the same or a higher frequency than at the end. In such cases, the capacity of the resonance circuit may be adjustable in large steps, the current being preferably broken at the adjusting operations.

The grid voltages for the control may in many cases be derived directly from the voltages of the working circuit, for instance from the condenser voltage. If it is for the sake of simplicity assumed that the anodes are ignited immediately after the grid voltages have been made positive with respect to the cathode, $\beta$ will mean the phase angle, referred to the natural frequency $\omega$, by which the zero value of the grid voltage must lead that of the condenser voltage. For small values of the angle $\psi = \pi - \omega T$ and low values of the power factor $\cos \varphi$ it is approximately obtained $$tg \beta = \frac{2}{\cos \varphi} \cdot \frac{\psi}{\pi - \psi}$$

$\beta$ should therefore increase from the beginning to the end of the melting period, not only because $\cos \varphi$ decreases, but also because $\psi$ should generally increase for the sake of voltage and power regulation.

A simple connection for deriving the grid voltage is shown in Figure 6a. The voltage on the furnace winding L is transformed by means of a small transformer sp feeding an impedance consisting of a resistance r and a condenser c. The grid voltages are derived from the ends of the resistance and may be passed over further regulating resistances $r_1$, $r_2$. A battery b may be connected between the midpoint of the resistance r and the cathode for superimposing on both grids a constant negative voltage on the alternating current voltage derived from the resistance r. The difference in operation with and without a battery can be seen from Figure 6c, in which the upper part shows the grid voltage $e_g$ without and the lower part with the battery. In the latter case the blocking action becomes more safe, as the grid voltage, if it is 0 for $t=0$, is already negative for $t=T$, while in the former case it is 0 at both instants. If it is desired to keep the power of the furnace constant or to vary it according to a predetermined law, which implies a corresponding constant-keeping or variation of the direct current, the latter can be caused to act on the sensitive member of a relay or regulator, the executing member of which actuates the adjustable taps on the resistance $r$. Such a regulation should generally take place, since otherwise $\beta$ decreases during the melting according as $\omega$ and therewith $\omega_g$ (the frequency of the grid voltage) increase.

Figure 6b only shows the modification with respect to Figure 6a, that the resistance $r$ is replaced by an inductance $l$ and the condenser $c$ by a resistance $r$.

The increase of the phase angle between the furnace voltage V and the grid voltage $e_g$ which is required, according to Figures 3 and 5, for a decreasing power factor, can be easily obtained automatically due to the circumstance, that the furnace current and/or the condenser current increases for decreasing power factor and increasing natural frequency $\omega$ and further is nearly in quarter phase with the furnace voltage. For this reason, there can easily be added, to a control voltage obtained according to Figures 6a or 6b, a voltage the phase displacement of which against the furnace voltage is increased with increasing frequency. Figure 7a shows an arrangement for this purpose, consisting of a current transformer $st$, the primary winding of which is traversed by the condenser current while two secondary windings furnish voltages which are connected in series with the grid voltages, the fundamental voltage of which may in this case be obtained from a substantially ohmic circuit. The mode of operation is clear from Figure 7b in which $e_0$ is the fundamental voltage obtained from the resistance connection and $e_1$ the additional component obtained from the current transformer, for two different values of the reactive current. $e_g$ designates the corresponding values of the resultant grid voltage. If the resistance combination, according to Figure 8a, contains an inductance $l_1$ instead of a resistance in series with the resistance $r$, the diagram is modified in accordance with Figure 8b, that is, so that $e_g$ obtains a substantially constant numerical value for different phase angles. By suitably proportioning the different voltage components, the regulation can be made quite automatic without varying the resistances, such a variation being, on the contrary, probably necessary according to Figure 7a, for which reason it has been conventionally indicated for one of the resistances.

In Figure 9a, a two-phase induction regulator IR has been inserted between the furnace winding and the grid voltage circuit for rotating the phase of the grid voltage at will with respect to that of the furnace voltage. On the primary side of the induction regulator, there is impressed not only the furnace voltage, but also the voltage from the current transformer $st$, both modified through resistances. On the secondary side there is a resistance $r$ in series with an inductance $l$ containing iron which has been saturated by a superimposed direct current. The latter does not materially affect the phase of the grid voltage which can be adjusted at will by means of the induction regulator, but on the other side it affects the curve shape of the voltage which obtains the aspect shown in Figure 9b, so that the voltage reaches full value only in the instants when such is necessary for the blocking action. Hereby the grid is relieved of an unnecessary ion bombardment.

The grid voltage may of course also be obtained from a high frequency generator of suitable construction. The latter may be driven either by a synchronous motor which is in its turn driven by the furnace voltage, in which case the manner of operation is essentially analogous to that of the connections already described, or by a direct current motor, the speed of which is regulated for instance by means of a high speed regulator so that the power of the furnace will be that desired. The two ways of connections may also be combined in such way that the synchronous generator is mainly driven by a direct current motor but in the same time kept in synchronism by a synchronous motor. The latter then has a tendency to adjust the synchronous generator to a mean value of the phase angle $\beta$ between grid voltage and furnace voltage, and the direct current motor causes a variation of this mean value and thus a regulation of the power in the furnace, while the synchronous motor causes the control frequency to follow substantially the natural frequency at the variations of the latter. It is also possible to use some one of the arrangements illustrated in Figures 6 to 9 during normal melting and some one of the last described ones during the starting period.

For the starting an arrangement may also be employed which permits the immediate connection of the condenser to a source of current and its subsequent discharge through the resonance circuit. The oscillations in the latter are thus initiated and furnish the voltages necessary for the grid control, and as soon as these have been obtained, the operation will begin without any further steps being necessary. For the starting, therefore, only a change-over switch is needed, by means of which the condenser can be cut off from the resonance circuit and connected to a suitable source of current. In some cases, auxiliary apparatus to be described in detail below may be added. Such an arrangement is shown in Fig. 10, while Fig. 11 shows a modification of certain details.

The grid voltages are here tapped between the said elements and the midpoint of the winding L and transferred to the control grids over a transformer $t$, a battery $b$ and resistance $r_1$, $r_2$. The condenser C is provided with a change-over switch O, by means of which it can be connected alternatively to the resonance circuit, that is, to the terminals of the winding L and to the anodes, or to a separate source of current S. The latter preferably consists of a source of direct current of about the same voltage as the source of current normally feeding the installation, or even of a somewhat higher voltage, so that the oscillations will set in at once with full power. It may however also consist of a source of alternating current in which case the condenser is generally automatically charged with the crest value of the alternating current voltage, as in cutting out the source of current by the change-over switch, the definite interruption generally takes place at a normal zero passage of the alternating current, that is, at the crest value of the voltage which is in quarter phase with the current.

In many cases it is advantageous to feed the installation at the beginning of a period of operation not by the full direct current or low frequency alternating current voltage, but to begin by a lower voltage and gradually raise it, as the conditions begin to stabilize and necessary adjustments can be made. Since, however, the grid voltage generally must already from the beginning have its full value, the connection of the auxiliary circuit to the main circuit is preferably made adjustable, for instance by connecting the terminals of the former to different taps $u$ on the winding L. The auxiliary circuit may thus at the start be connected to the ends of the winding L and afterwards to taps lying closer together so as to retain the same voltage for increased voltage on the winding L.

For the same purpose also the connection shown in Figure 11 can be used, in which the primary winding $i_1$ of a single phase induction regulator is connected to the winding L, the said induction regulator having a short-circuited auxiliary phase winding $i_a$ and a rotatable secondary winding $i_2$ feeding the auxiliary circuit for creating the grid voltages.

We claim as our invention:—

1. Means for operating high frequency induction furnaces, comprising a source of current, a resonance circuit containing capacity and inductance, a metal vapor ion valve apparatus for passing a current from said source alternately in both directions through said resonance circuit, control grids for said apparatus, means for feeding the said grids by voltages derived from said resonance circuit, and a change-over switch for cutting off said capacity from said resonance circuit and connecting said capacity directly to a source of current.

2. Means for operating high frequency induction furnaces, comprising a source of current, a resonance circuit containing capacity and inductance, a metal vapor ion valve apparatus for passing a current from said source alternately in both directions through said resonance circuit, control grids for said apparatus, means for feeding the said grids by voltages derived from said resonance circuit, and a change-over switch for cutting off said capacity from said resonance circuit and connecting said capacity directly to a source of direct current.

LUDWIG DREYFUS.
AAGE GARDE.